United States Patent [19]

VanderVeen

[11] 4,084,857
[45] Apr. 18, 1978

[54] DRIVE KEY HEAT SHIELD AND SUPPORT FOR WHEEL RIM HEAT SHIELD OF MULTIPLE DISC BRAKE

[75] Inventor: Jaring VanderVeen, South Bend, Ind.

[73] Assignee: The Bendix Corporation, South Bend, Ind.

[21] Appl. No.: 752,574

[22] Filed: Dec. 20, 1976

[51] Int. Cl.² .............................................. B60B 19/00
[52] U.S. Cl. ................................ 301/6 A; 301/6 WB; 188/264 G
[58] Field of Search ............ 301/6 R, 6 A, 6 E, 6 CS, 301/6 WB; 188/264 G

[56] References Cited

U.S. PATENT DOCUMENTS

| 2,129,115 | 9/1938 | Best .................................. 301/6 WB |
| 3,051,528 | 8/1962 | Rogers ............................... 301/6 CS |
| 3,061,050 | 10/1962 | Van Horn .......................... 301/6 A |
| 3,191,735 | 6/1965 | Wavak ................................. 301/6 R |
| 3,345,109 | 10/1967 | Petersen et al. .................... 301/6 R |
| 3,754,624 | 8/1973 | Eldred ......................... 188/264 G X |
| 3,836,201 | 9/1974 | Stimson et al. ................. 301/6 E X |
| 3,958,833 | 5/1976 | Stanton ......................... 301/6 WB X |
| 4,017,123 | 4/1977 | Horner et al. ................... 301/6 WB |

Primary Examiner—Robert B. Reeves
Assistant Examiner—Charles A. Marmor
Attorney, Agent, or Firm—Ken C. Decker

[57] ABSTRACT

A key boss cap particularly adapted for use with an aircraft wheel surrounded multiple disc brake wherein the wheel is provided with a plurality of circumferentially spaced apart fixed drive keys extending into drivable engagement with a plurality of brake rotor discs. The key boss cap is a U-shaped member with or without flanges and is interposed between the key boss of the wheel and the U-shaped steel cap key which form the drive key assembly to drive the rotors of the disc brake. The key boss cap retards heat transfer from the cap key to the key boss integral with the wheel rim. The flanges on the key boss cap are adapted to keep the edges of wheel rim heat shields positioned between adjacent key bosses from touching the wheel rim thereby preventing heat transfer and vibration damage to the wheel rim.

10 Claims, 5 Drawing Figures

DRIVE KEY HEAT SHIELD AND SUPPORT FOR WHEEL RIM HEAT SHIELD OF MULTIPLE DISC BRAKE

BACKGROUND OF THE INVENTION

The use of heat shields in the aircraft disc brake environment is known in the art as evidenced by U.S. Pats. Nos. 3,051,528; 3,829,162; and 3,958,833. Furthermore, application Ser. No. 673,232, filed Apr. 2, 1976, and assigned to the assignee of the present application, discloses a dual layer heat shield which is received between adjacent rotor disc drive key members.

Due to the lighter, more highly stressed aircraft wheels, heat shields are absolutely necessary to protect the wheel rim from the heat produced during brake application. Under certain operating conditions such as an aborted or rejected take-off, a total braking effort is exercised resulting in an extreme heated condition of the frictionally engaged rotor and stator discs of the brake as well as the remaining brake structure in the immediate vicinity of the rotor and stator discs. The heat load imposed on the brake causes material therein such as the metallic base friction lining or pads to become semi-molten. The semi-molten material as well as other heated brake debris is thrown radially outwardly against the heat shield by the rotor discs. If the heat shields contact the tire supporting rim portion, the heat transferred to the rim may produce localized highly stressed areas thereof and thereby cause subsequent structural failure of the wheel or tire which, for obvious reasons, has disastrous results on the aircraft supported thereby.

SUMMARY OF THE INVENTION

The present invention relates to a heat resistant shield adapted to form an insulating layer between the steel cap key and the integral key boss of an aircraft wheel with multiple disc brake assembly. The shield retards heat transfer into the wheel by interposing a relatively low conductivity material and thereby creates a second interface between the cap key and key boss, yet is structurally rigid so it will not crush when the cap key drives the rotor discs. The heat resistant shield of the present invention may also be provided with flanges that extend outward from the cap key above the rim portion of the wheel. These flanges can then be adapted to support the edges of heat shields which are received between adjacent key bosses of the wheel.

It is an object of the present invention to provide a structurally rigid insulating layer between the steel cap key and the key boss which will not crush so as to materially affect the cap key's function of driving the rotor discs.

Another object of the present invention is to provide a support for the edges of the wheel rim heat shields so that the edges do not contact the rim portion of the wheel during either normal vibrations or during extreme braking conditions.

DESCRIPTION OF THE PREFERRED EMBODIMENT

Figure 1:
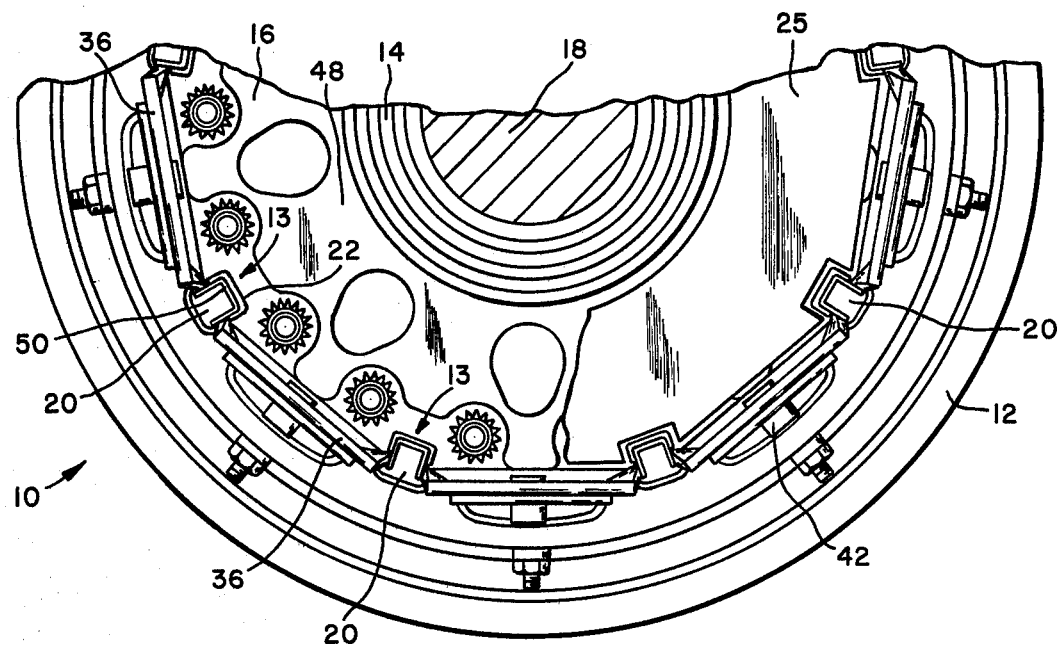
FIG. 1 is a schematic plan view of a portion of an aircraft wheel embodying wheel rim heat shields and the key boss cap heat shields of the present invention.
Figure 2:
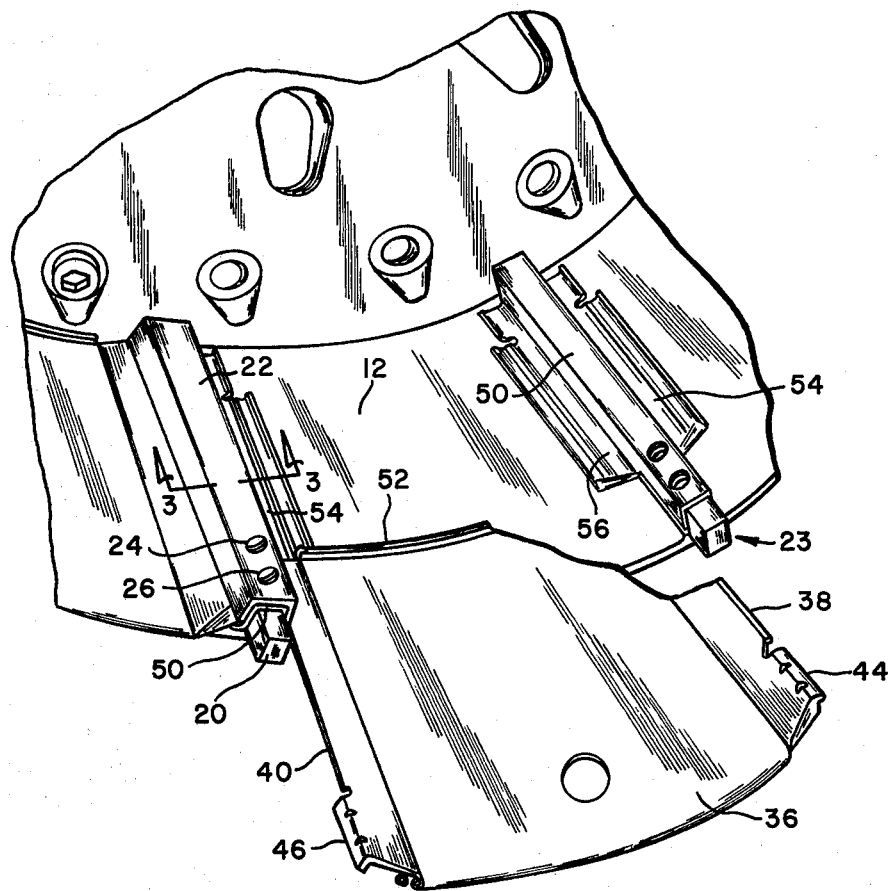
FIG. 2 is a perspective view of the wheel of FIG. 1 and shows the key boss cap heat shields in position to receive a wheel rim heat shield.
Figure 5:
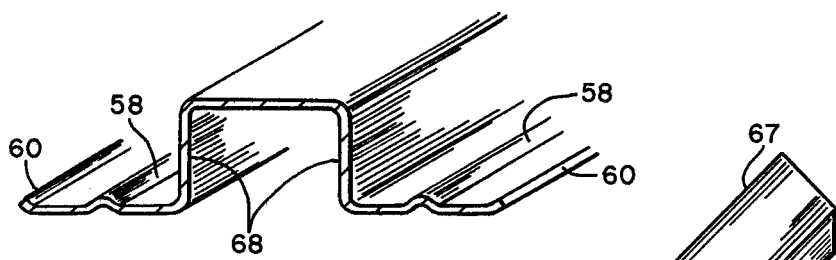
FIG. 5 is a cross-sectional view taken on line 5—5 of FIG. 4 showing the support ridges in each flange.

In the Figures numeral 10 designates a conventional aircraft wheel having a rim portion 12 upon which an inflatable tire, not shown, is mounted. The wheel 10 includes a central hub portion 14 which is rotatably mounted by suitable bearing means, not shown, on an axle 18 and is connected to rim portion 12 via a web portion 16. A plurality of rotor disc drive key members, generally shown at 13, are defined by circumferentially spaced-apart axially extending bosses 20 formed on the inner wall of rim portion 12. Each of the bosses 20 receive a U-shaped cap key member 22 fixedly secured thereto by screws 24 and 26 which threadedly engage boss 20. Of course, bolt-in bosses 20 may be used instead of those shown integral with the rim portion, as is well known to those skilled in the art. The bosses 20 may extend axially beyond the edge of rim portion 12 as shown at 23. The cap key members 22 are slidably engaged axially with mating slots in one or more rotor discs 25 and drive said rotor discs. Sidewalls 28 and 30 of cap key member 22 overlap the side walls of boss 20 and terminate short of axially extending abutments 32 and 34 formed on opposite sides of boss 20 at the base thereof. The rim portion 12 and web portion 16 define an open-ended cavity 48 adapted to receive a conventional aircraft multiple disc brake assembly. Reference is made to U.S. Pat. No. 3,403,759 assigned to the assignee of the present application for an example of a typical aircraft wheel and a multiple disc brake assembly therefor.

During an extended hard brake application such as occurs in the heretofore-mentioned rejected take-off, the heat load imposed on the brake elements and, in particular, the conventional rotor and stator friction discs thereof, may be of such magnitude that heated, semi-molten metallic or nonmetallic particles break off the brake structure and are discharged radially outwardly with respect to the wheel 10 by the rotor friction discs. The rim portion 12, being exposed to the heated brake structure, and the heated particles, will experience a temperature rise as a result of conventional radiation, convection and conduction heat transfer from the brake structure and because of the semi-molten brake particles which create localized hot spots. The resulting temperature rise of the rim portion 12 frequently causes structural deterioration of the rim portion 12 and the tire mounted thereon, not shown, and subsequent structural failure of the same.

The rim portion between adjacent drive key means 13 is protected by heat shields 36 made pursuant to the teachings of the above cited U.S. Pat. No. 3,051,528 or U.S. Pat. No. 4,017,123. The heat shield 36 has right and left edges 38 and 40 that loosely engage the side walls of boss 20 in the space between the ends of sidewalls 28 and 30 of cap key member 22 and abutments 32 and 34, respectively. The heat shields are held in spaced-apart relationship to the wheel rim 12 by fastening means 42 and support tangs 44 and 46. The fastening means 42 holds the central portion of the heat shield in rigid condition from both upward and downward movement. The support tangs 44 and 46 rest on the rim portion 12 adjacent the abutments 32 and 34, respectively. Both the fastening means and support tangs are at the outer end of the heat shield because this portion of wheel rim 12 is much thicker and less stressed. Upward movement of the heat shield edges 38 and 40 is prevented by side walls 28 and 30 of cap key member 22.

The heat shields 36 have solved a major portion of the heat problem; however, heat is still conducted into the rim through bosses 20. Because cap key member 22 engages the rotors 25, which are heated during a brake application, heat is conducted directly to the cap key member 22 and is conducted in turn to the bosses 20. Since cap key member 22 drivingly engages the rotors 25, it is usually made of steel for rigidity. Since steel is a heat conductive metal, the heat transfer problem is further complicated. Heat transfer to the rim portion is even more critical with the development of carbon composite frictional material.

To solve the heat transfer problem through the bosses 20, the present invention provides a U-shaped insulating member 50 that fits between the boss 20 and U-shaped cap key member 22. This insulating member can be made of any material that has both low conductivity and is structurally strong, since relatively high forces are exerted upon cap key member 22 when driving rotor discs 25. The preferred embodiment of the insulating member is made of stainless steel because of the low conductivity and strength of this material; however, many other materials are suitable.

In order to obtain the maximum protection from heat transfer to the wheel rim, the aforementioned heat shields 36 must be adapted to cover as much rim portion as possible. However, because of the slightly inward taper of bosses 20, both the frontal edge 52 and axial edges 38 and 40 of the heat shield 36 come very close to the wheel rim and this portion of the wheel rim is highly stressed and susceptible to damage. The forces generated during braking may cause the heat shield edges 38, 40 and 52 to vibrate against the wheel rim which can damage the wheel rim finish and subsequent corrosion could cause fatigue cracks. The heat shield edges 38, 40 and 52 cannot be supported by tangs 44, 46 nor with fastening means 42 because of the wheel's stress characteristics. The prior art disclosed in U.S. Pat No. 3,051,528 teaches the use of a spring member with projections to hold up the frontal edge of the heat shield; however, this method is not feasible with the use of cap key member 22.

To obtain maximum protection afforded by large heat shields 36 and yet maintain a clearance between these heat shields and the highly stressed portions of the wheel rim, the key boss cap heat shield member has been provided with flanges 54 and 56 which extend outwardly from the open end of the U-shaped portion. These flanges 54, 56 are supported by the U-shaped portion covering the boss 20. The flanges 54, 56 engage and support the edges 38 and 40 of the heat shield 36. The length of side walls 68 is greater than that of side walls 28 and 30 in order to provide a space between the ends of the side walls 28 and 30 of cap key member 22 and flanges 54 and 56. The thickness of the sidewalls 28 and 30 of cap key member 22 prevents upward movement of the edges 38, 40 of the heat shield 36 while the flanges 54 and 56 prevent downward movement of the edges 38, 40. The support provided by the flanges 54, 56 of the edges 38 and 40 of heat shield 36 also support the frontal edge 52 from vibrating against the wheel rim 12. The heat shield is made of stainless steel 0.014–0.016 inches thick in order to minimize its weight. The relatively thin flanges 54 and 56 are made more rigid by grooves 58 which are stamped in the bottom along the axial length of each flange. Also, edges 60 and 62 are bent slightly upward to give additional support along the axial length of each flange. These support grooves 58 and edges 60, 62 will also act themselves to support the wheel rim heat shields 36 if a situation develops such as in a severe rejected take-off, where the centrifugal forces on the extruded lining residue could cause the flanges 54, 56 to deflect and remain in contact with the wheel rim. With the flanges 54, 56 in contact with the wheel rim, both the short radius in grooves 58 and turned up ends 60, 62 give great rigidity and stiffness to maintain a small clearance between the hot wheel rim heat shield 36 and the wheel rim.

Figure 4:
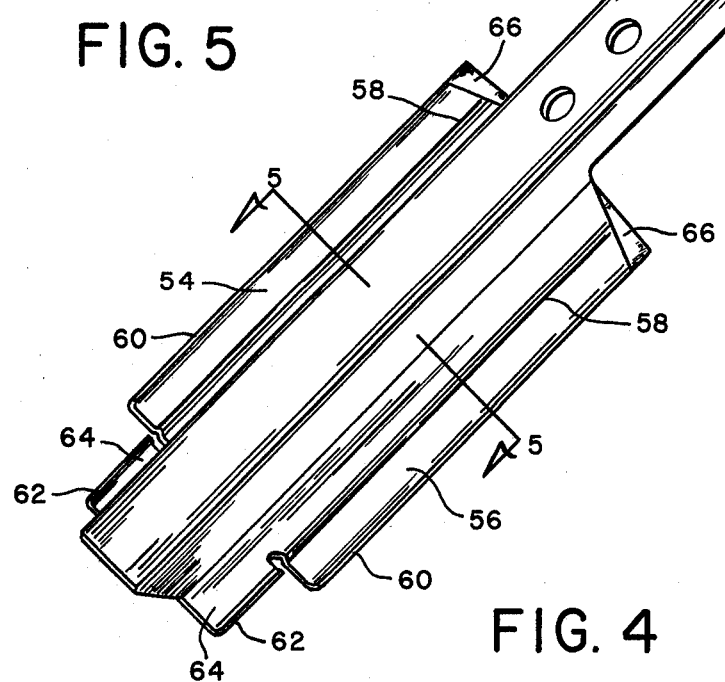
FIG. 4 is a perspective view of the key boss cap heat shield as adapted to fit a particular aircraft wheel.
Figure 3:
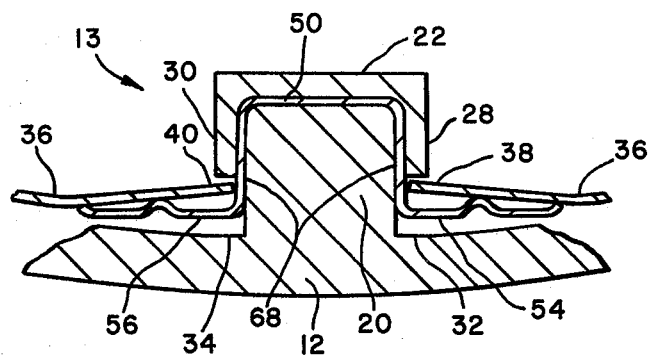
FIG. 3 is a cross-sectional view taken on line 3—3 of FIG. 2 showing the key boss cap heat shield in its assembled position supporting the wheel rim heat shields.

As seen in FIG. 4, the preferred embodiment has specific adaptations to fit a particular aircraft wheel in conjunction with the dual layer heat shields of U.S. Pat. No. 4,017,123. As shown, the flanges 54, 56 do not extend the complete axial length of the U-shaped member. Portion 67 extends to mate with that portion of boss 20 which extends axially beyond the adjacent rim portion 12 as shown previously at 23. The bosses of the preferred embodiment are integral with the wheel rim and taper inwardly toward the web portion 16. In order to maintain sufficient clearance between the inward portions 64 of the flanges and the wheel rim, the width of the flange portions 64 has been reduced in width. However, the flange portions 64 are necessary to support the frontal edge 52 of the heat shield 36. The outer portions of flanges 54 and 56 are bent slightly downward at 66 to guide the heat shields when they are inserted in the wheel.

I claim:

1. A wheel and heat shield assembly comprising:
 a tire supporting wheel rim defining a brake cavity adapted to receive a brake assembly, said brake assembly having rotatable and non-rotatable frictionally engageable members;
 circumferentially spaced elongated drive key means carried by said wheel rim said drive key means extending radially inwardly from said wheel rim into engagement with said rotatable members;
 a plurality of rim heat shield members each being independently and removably secured in position between said drive key means to define a substantially continuous annular wall having radially spaced-apart relationship to said wheel rim; and
 each of said drive key means including a boss member carried by said wheel rim, a cap key member removably secured to said boss member so that said cap key member engages said rotatable members, and a key boss cap heat shield member disposed between said cap key member and said boss member, with said key boss cap heat shield member extending over said boss and interconnecting adjacent said rim heat shield members, said interconnection adapted to maintain said independent removability of said rim heat shield members from said assembly.

2. A wheel and heat shield assembly as claimed in claim 1, wherein:
 each said key boss cap heat shield member has a flange extending outwardly away from each side of said boss member along said wheel rim into engagement with adjacent said rim heat shield members.

3. A wheel and heat shield assembly as claimed in claim 2, wherein:
said boss member has right and left side portions and a top portion;
said key boss cap heat shield member has right and left side portions and a top portion forming a U-shape, said U-shaped key boss cap heat shield member being disposed over said boss member with said right, left and top portions of said key boss cap heat shield member engaged with said right, left and top portions of said boss member, respectively;
said cap key member has a right and left side portion and a top portion forming a U-shape, said U-shaped cap key member being disposed over said key boss cap heat shield member with said right, left and top portions of said cap key member engaged with said right, left, and top portions of said key boss cap heat shield member, respectively; and
each said key boss cap heat shield member has a flange extending outwardly from each said right and left side portion, said flanges being engaged with and support adjacent said rim heat shields to maintain said spaced-apart relationship of said rim heat shields and said wheel rim.

4. A wheel and heat shield assembly as claimed in claim 3, wherein:
said right and left side portions of said cap key member are shorter in vertical length than said right and left side portions of said key boss cap heat shield member, respectively; thereby providing right and left radial ends to said right and left side portions of said cap key member, respectively;
said flanges extending from said right and left side portions of each said key boss cap heat shield member are adapted to extend outwardly from said respective side portions at a distance below said right and left radial ends of said cap key member such that edges of said adjacent rim heat shields communicate with and are restrained respectively by said flange and said radial end of said side portion of said cap key member.

5. A wheel and heat shield, as claimed in claim 3, wherein each said flange has a support ridge that runs along the axial length of each said flange and the outer edge of each said flange extends slightly upwardly and outwardly for additional strength.

6. A wheel and heat shield assembly as claimed in claim 4, wherein each said flange has a support ridge that runs along the axial length of each said flange and the outer edge of each said flange extends slightly upwardly and outwardly for additional strength.

7. A wheel and heat shield as claimed in claim 1, wherein:
said interconnection between said key boss cap heat shield member and adjacent said rim heat shield members is further adapted to support said adjacent rim heat shields thereby maintaining said spaced-apart relationship of said rim heat shields and said wheel rim.

8. A wheel and heat shield assembly as claimed in claim 7, wherein:
said boss member has right and left side portions and a top portion;
said key boss cap heat shield member has right and left side portions and a top portion forming a U-shape, said U-shaped key boss cap heat shield member being disposed over said boss member with said right, left and top portions of said key boss cap heat shield member engaged with said right, left and top portions of said boss member, respectively;
said cap key member has a right and left side portion and a top portion forming a U-shape, said U-shaped cap key member being disposed over said key boss cap heat shield member with said right, left and top portions of said cap key member engaged with said right, left, and top portions of said key boss cap heat shield member, respectively; and
each said key boss cap heat shield member has a flange portion extending outwardly from each said right and left side portion, said flanged portions being engaged with and support adjacent said rim heat shields to maintain said spaced-apart relationship.

9. A wheel and heat shield assembly as claimed in claim 8, wherein:
said right and left side portions of said cap key member are shorter in vertical length than said right and left side portions of said key boss cap heat shield member, respectively; thereby providing right and left axial ends to said right and left side portions of said cap key member, respectively;
said flanges extending from said right and left side portions of each said key boss cap heat shield member are adapted to extend outwardly from said respective side portions at a distance below said right and left axial ends of said cap key member such that edges of said adjacent rim heat shields communicate with and are restrained respectively by said flange and said axial end of said side portion of said cap key member.

10. A wheel and heat shield, as claimed in claim 9, wherein each said flange has a support ridge that runs along the axial length of each said flange and the outer edge of each said flange extends slightly upwardly and outwardly for additional strength.

* * * * *